United States Patent [19]

Cohn

[11] 4,282,757
[45] Aug. 11, 1981

[54] DEVICE FOR DETECTING RATE OF CHANGE IN PRESSURE

[75] Inventor: Alan R. Cohn, El Cerrito, Calif.

[73] Assignee: Grove Valve and Regulator Company, Oakland, Calif.

[21] Appl. No.: 80,988

[22] Filed: Oct. 1, 1979

[51] Int. Cl.³ .................... G01L 7/08; G05D 11/00
[52] U.S. Cl. ........................... 73/714; 73/199; 73/716; 137/117
[58] Field of Search .............. 73/199, 210, 211, 707, 73/228, 714, 40.5 R, 716; 137/117

[56] References Cited

U.S. PATENT DOCUMENTS

| Re. 25,391 | 5/1963 | Farkas | 137/117 |
|---|---|---|---|
| 2,647,402 | 8/1953 | Ibbott | 73/210 |
| 2,937,656 | 5/1960 | Evans et al. | 137/117 |
| 2,957,488 | 10/1960 | Farkas | 137/117 |

FOREIGN PATENT DOCUMENTS 573191  2/1958  Italy .......................................... 73/210

Primary Examiner—Donald O. Woodiel
Attorney, Agent, or Firm—Melvin R. Stidham

[57] ABSTRACT

Apparatus for detecting a rate of pressure rise in a pipeline higher than an acceptable level, comprising a monitor conduit which is connected between the pipeline and a monitor chamber of uniform cross-section with a spring-biased piston or diaphragm therein. The invention contemplates means for producing a signal proportionate to the flow through said monitor conduit and, hence, to the rate of pressure change in the pipeline. One embodiment includes a device which senses the difference in pressure between the pipeline and the monitor chamber and delivers a signal when that difference becomes excessive. In another embodiment, a liquid reservoir at atmospheric pressure is connected to fill the monitor chamber on the other side of the diaphragm, so that the liquid pressure in the monitor chamber is proportionate to the rate of change of pressure in the pipeline and, when this pressure becomes excessive, an energizing signal is generated to relieve the surge.

5 Claims, 2 Drawing Figures

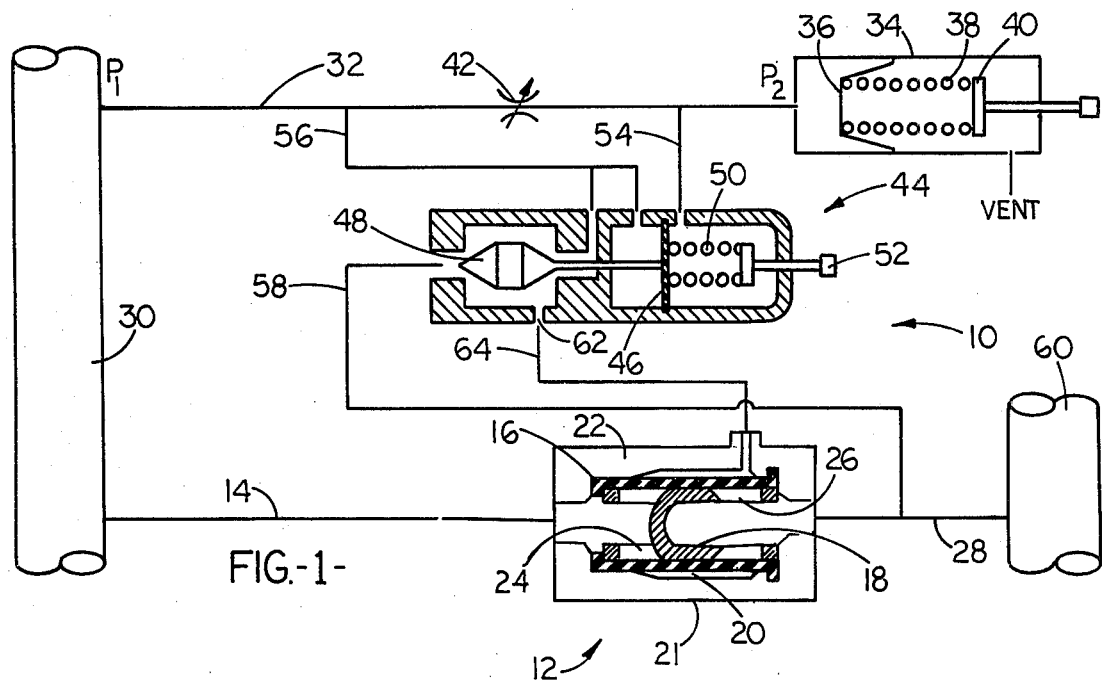
FIG.-1-
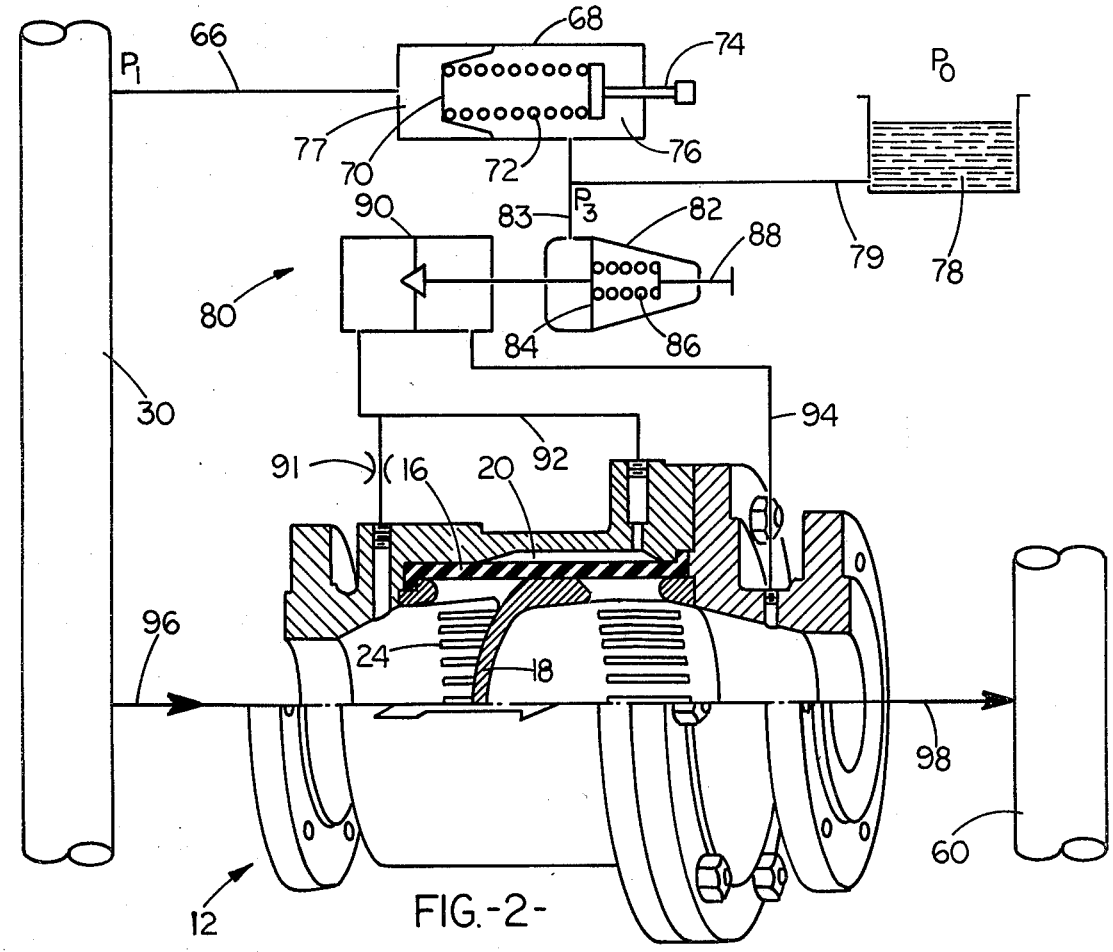
FIG.-2-

DEVICE FOR DETECTING RATE OF CHANGE IN PRESSURE

BACKGROUND OF THE INVENTION

In pipeline operation, certain incidents, such as starting up a pump or closing a valve, sould produce surges in the pipeline which rapidly traverse the pipeline and, under certain circumstances, could build up to dangerous proportions and may cause pipeline damage. In some pipeline installations, conventional relief valves are installed so that when dangerously high pressures are reached the valves are opened to dump some of the fluid into a reservoir to relieve the pressure. However, the mere level of pressure is not necessarily indicative of a surge and, unless such pressure sensing devices are located at a point in the pipeline where surges are likely to be of the greatest intensity, they have to be set to operate at pressure levels which are not themselves dangerous but which may be dangerous in the event of an increasing surge. As a result, they may relieve pressures which are reached gradually and which present no threat of a surge and, as a result, a quantity of fluid is needlessly dumped to a reservoir.

A more important indicator is the rate of pressure rise and if a predetermined rate is exceeded, according to pipeline design, the surge should be relieved, even though the pressure level at the point of detection is not at a dangerous level. In some systems, differential pressure devices are provided, with instantaneous pipeline pressure being measured against a delayed pre-existing pipeline pressure so that actuation of the device would reflect increase at an excessive rate.

OBJECT OF THE INVENTION

It is the object of this invention to provide a device which does not require a separate reference pressure circuit.

It is a further object of this invention to provide an apparatus for producing a signal pressure which is proportionate to the rate of change in pipeline pressure.

Other objects and advantages of this invention will become apparent from the description to follow, particularly when read in conjunction with the accompanying drawings.

SUMMARY OF THE INVENTION

In carrying out this invention, a monitor line is connected from the pipeline to a monitor chamber, which has a uniform cross-section along which a pressure-responsive member, such as a piston or a diaphragm, is movable. A spring having an initial set force to balance normal pipeline pressures biases the pressure-responsive member toward one end of the monitor chamber in opposition to the pipeline pressures. A change in pressure causes the spring to compress and fluid will flow through the monitor line into the pressure side of the monitor chamber. Means are provided to maintain flow into the monitor chamber constant, reflective of an acceptable rate of pressure change. In one embodiment, an orifice is placed in the monitor line allowing flow to be measured by the pressure difference across the orifice. A differential pressure controller examines the pressure difference, and when the difference becomes excessive, indicative of an unacceptable rate of pressure change, actuates a surge relief valve which reduces the rate of pressure change by dumping some fluid from the pipeline to the reservoir. In another embodiment, the monitor line is free of restrictions, and the spring side of the monitor chamber is filled with a liquid from a reservoir at atmospheric pressure. As a result the pressure in the spring side of the monitor chamber is proportional to the rate of change of line pressure and it is, therefore monitored by a pilot valve. When the pressure on the spring side becomes excessive, the pilot valve actuates a surge relief valve.

BRIEF DESCRIPTION OF THE DRAWING

In the drawings:

FIGS. 1 and 2 are schematic diagrams of two preferred embodiments of this invention.

DESCRIPTION OF PREFERRED EMBODIMENTS

The Embodiment of FIG. 1

Referring now to FIG. 1 with greater particularity, the surge relief system 10 of this invention is adapted to be used with a fluid control valve 12 of the type which opens when upstream pressure overcomes pressure in a control chamber or jacket. For example, in the expansible tube valve shown, pressure in the upstream line 14 acts against the inside of a flexible tube 16 which is stretched around a dam or barrier 18 in a core or cage 20 within the valve body 21. When the pressure in a jacket 22 surrounding the tube 16 is reduced to a level below line pressure by an amount sufficient to enable line pressure to overcome the hoop tension in the tube 16, the tube will stretch outward to enable flow through upstream slots 24 and around the barrier 18, back through downstream slots 26 and out the downstream flow passage 28.

In utilizing the system 10 to monitor pressures in the pipeline 30 for relief of surges therein, a monitor line 32 connects the pipeline 30 to a cylinder 34, in which is carried a pressure-responsive movable member, as for example a diaphragm 36 acting against a spring 38, the force of which may be set by means 40 to balance a normal pipeline pressure. The spring 38 is selected to remain compressible at the maximum tolerable pipeline pressure so that it will continue to compress and generate a pressure in the monitor cylinder 34 over the full pipeline pressure range.

With flow in the monitor line 32, there is a drop in pressure from line pressure $P_1$ to a lower comparing pressure $P_2$ generated against the diaphragm 36.

The monitor chamber 34 senses a rate of change in pressure in the pipeline 30 in a manner to be described. The change in volume of fluid within the monitor cylinder 34 is proportional to the flow (q) through the monitor line 32. Since the cross-sectional area of the cylinder is constant, the change in fluid volume within the cylinder is proportional to the change in the position of the diaphragm 36. The resultant force of the spring 38, which is a measure of the monitor chamber pressure $P_2$ is, in turn, proportional to the position of the diaphragm. Hence, the change in pressure $(P_1-P_2)$ is proportional to the rate of change of pressure $P_2$ in the monitor chamber 34.

In surge relief systems it is desirable to have a constant rate of change of the line pressure $P_1$ and this is accomplished in the system 10 by requiring the flow q through line 32 to remain constant by provision of a pilot valve 44 and the surge relief valve 12 previously described.

The pilot valve 44 includes a diaphragm 46, which operates a valve member 48. The valve member is biased toward closed position by a spring 50. Spring force is adjustable at 52. The line 54 connects the pressure $P_2$ acting against the monitor diaphragm 36 to that side of the diaphragm 46 against which the spring 50 acts, and the line 56 connects the pipeline pressure $P_1$ to the other side of the diaphragm in opposition to the spring 50. The spring 50 is set to maintain the desired difference in pressure $(P_1-P_2)$.

The flow in monitor line 32 is proportional to the square root of the pressure difference $(P_1-P_2)$. Hence, if the pressure difference is constant, as monitored by the pilot valve 44, the flow is constant; the rate of change of the monitor chamber pressure $P_2$ is constant; and as a result, the rate of change in line pressure $P_1$ is also constant.

In monitoring the pressure differential, the pilot valve 48 is moved to the right in FIG. 1 to open when $P_1-P_2$ becomes excessive indicating that line pressure is increasing at an unacceptable rate. With the pilot valve open, the main valve jacket will bleed through lines 64, 58 and 28 to a reservoir 60, allowing the main relief valve 12 to open and dump a quantity of fluid from the pipeline 30 to the reservoir 60. When the pressure differential $P_1-P_2$ falls to an acceptable level, the valve 48 shifts to the left in FIG. 1 to close off flow to the downstream. Flow through the throttle 62 will then build up pressure in the jacket 22 to the level of the line pressure, closing off the main valve 12.

The rate of pressure change setpoint is adjusted by two means: The variable orifice 42, and the spring force adjustment 52.

The Embodiment of FIG. 2

In this embodiment, the monitor line 66 is connected to a monitor cylinder 68 acting against the diaphragm 70 opposed by a spring 72 which is adjusted at 74. The chamber 76 on the other side of the diaphragm 70 is filled with a liquid from monitor reservoir 78 which is at atmospheric pressure $P_0$. With the monitor cylinder 68 being filled, flow out of the chamber 76 on the monitor liquid side of the diaphragm to the line 79, is equal to flow into the other chamber 77 through monitor line 66. When flow exists, flow through the line 79 is laminar and, when laminar flow exists, it is proportional to the difference between chamber 76 pressure and monitor reservoir pressure. Since $P_0$ is atmospheric pressure, and hence constant, flow through liquid line 79 is proportional to $P_3$. (The static head of monitor reservoir is insignificant to pressure $P_0$). Since flow through monitor line 66 and liquid line 79 are equal, flow through monitor line 66 is also proportional to $P_3$. Now, since, as shown in the description of the embodiment of FIG. 1, flow in the monitor line 66 is proportional to the rate of change in pipeline pressure $P_1$, then the liquid pressure $P_3$ is proportional to the rate of change in line pressure $P_1$.

Hence, the surge relief system 80 of FIG. 2 produces a signal, i.e. the liquid pressure $P_3$, which is proportional to the rate of change in the pipeline pressure $P_1$. The pilot 82 is connected so that this signal pressure $P_3$ is directed by line 83 to act against the diaphragm 84 in opposition to the spring 86. Hence, when the signal pressure $P_3$ indicates a rate of pressure change in the pipeline 30 which is beyond the acceptable range, as translated by the force of spring 86, as set at 88, the valve 90 opens.

With the valve 90 open, the main valve jacket 20 bleeds through line 92, valve 90 and line 94 to the downstream side, enabling upstream pressure in the dumping line 96 to overcome the hoop tension of the flexible sleeve 16 and commence flow through line 98 to the reservoir 60 until the signal pressure $P_3$, indicative of the rate of pipeline pressure rise, falls to an acceptable level. When that safe level is again reached, the pilot valve 90 will close, and pipeline pressure in line 96 flowing through an orifice 91 will again build up the pressure in the jacket 20 to the level of the pipeline pressure whereby the main valve 12 will close.

The rate of pressure change set point is adjusted at pilot valve 82 by means of spring force set screw 88.

While this invention has been described in conjunction with preferred embodiments thereof, it is obvious that modifications and changes therein may be made by those skilled in the area without departing from the spirit and scope of this invention, as defined by the claims appended hereto.

What is claimed as invention is:

1. Apparatus for detecting a rate of pressure increase higher than an acceptable level comprising:
   a monitor conduit to be connected at one end thereof to a pipeline to be protected;
   a monitor chamber with a uniform cross section connected at one end thereof to the other end of said monitor conduit;
   a pressure-responsive, movable member across said chamber;
   a spring biasing said movable member toward said one end of said chamber; and
   means for producing a signal when rate of pressure increase in said pipeline exceeds a predetermined level;
   said last-named means comprising:
   an orifice in said monitor conduit; and
   a pilot valve with a valve member operated by a pressure-responsive member for comparing the pressures at said one and said other ends of said monitor conduit, operable to produce said signal when pressure at said one end exceeds pressure at said other end by a predetermined amount;
   first duct means connecting said other end of the monitor conduit to one side of said pressure-responsive member to bias said valve member toward closed position;
   adjustable force-applying means acting against said one side of the pressure-responsive member; and
   second duct means connecting said one end of the monitor conduit to the other side of said pressure-responsive member;
   said apparatus further including:
   a flow diverting line to be connected to said pipeline to deliver fluid to a reservoir;
   a surge relief valve in said diverting line to open when pressure in said diverting line overcomes pressure in a control jacket;
   said jacket being normally at a pressure to maintain said relief valve closed; and
   an evacuation line connecting said jacket to a zone of low pressure;
   said pilot valve being connected in said evacuation line.

2. The apparatus defined by claim 1 wherein said orifice is variable.

3. Apparatus for detecting a rate of pressure increase higher than an acceptable level comprising:

a monitor conduit to be connected at one end thereof to a pipeline to be protected;

a monitor chamber with a uniform cross section connected at one end thereof to the other end of said monitor conduit;

a pressure-responsive, movable member across said chamber;

a spring biasing said movable member toward said one end of said chamber; and means for producing a signal when rate of pressure increase in said pipeline exceeds a predetermined level;

said signal producing means comprising:

a reservoir of liquid at constant pressure;

a conduit connected between the other end of said monitor chamber and said reservoir; and a pressure signal line connected to said other end.

4. The apparatus defined by claim 3 wherein:

said reservoir is at atmospheric pressure.

5. The apparatus defined by claim 3 including:

pilot means operable when said pressure signal exceeds a predetermined level.

* * * * *